(12) United States Patent
Nakano et al.

(10) Patent No.: US 11,231,082 B2
(45) Date of Patent: Jan. 25, 2022

(54) HYDRAULIC DAMPING DEVICE

(71) Applicant: Showa Corporation, Gyoda (JP)

(72) Inventors: Gota Nakano, Gyoda (JP); Kazunari Maeda, Gyoda (JP); Hiroshi Endo, Gyoda (JP); Seiryo Konakai, Gyoda (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 42 days.

(21) Appl. No.: 16/485,082

(22) PCT Filed: May 10, 2017

(86) PCT No.: PCT/JP2017/017706
§ 371 (c)(1),
(2) Date: Aug. 9, 2019

(87) PCT Pub. No.: WO2018/163443
PCT Pub. Date: Sep. 13, 2018

(65) Prior Publication Data
US 2020/0080613 A1 Mar. 12, 2020

(30) Foreign Application Priority Data
Mar. 9, 2017 (JP) .............................. JP2017-045482

(51) Int. Cl.
*F16F 9/18* (2006.01)
*F16F 9/348* (2006.01)
*F16K 47/02* (2006.01)

(52) U.S. Cl.
CPC ............ *F16F 9/185* (2013.01); *F16F 9/3487* (2013.01); *F16K 47/02* (2013.01); *F16F 2222/12* (2013.01);
(Continued)

(58) Field of Classification Search
CPC ..................... F16F 9/348; F16F 9/3481–3488
See application file for complete search history.

(56) References Cited

U.S. PATENT DOCUMENTS 4,972,929 A * 11/1990 Ivers ..................... F16F 9/3484
188/282.6
5,085,300 A    2/1992 Kato et al.
(Continued)

FOREIGN PATENT DOCUMENTS

| CN | 103115103 A | 5/2013 |
| CN | 104343766 A | 2/2015 |

(Continued)

OTHER PUBLICATIONS

International Search Report dated Aug. 1, 2017 for the corresponding PCT International Patent Application No. PCT/JP2017/017706.
(Continued)

*Primary Examiner* — Vishal R Sahni
(74) *Attorney, Agent, or Firm* — Leason Ellis LLP

(57) ABSTRACT

The hydraulic damping device includes: a cylinder storing fluid; a piston configured to form a channel through which the fluid flows along with relative movement of a rod relative to the cylinder in a specific direction; a valve having elasticity, the valve being configured to open and close the channel in the piston; a movement permitting part configured to permit the valve to move between a contact position and a spaced position, the contact position being a position where the valve contacts the piston, the spaced position being a position where the valve is spaced from the piston; a restricting part configured to restrict bending of the valve at the spaced position; and a pressing part having elasticity, the pressing part being configured to press the valve against the piston.

2 Claims, 12 Drawing Sheets

(52) U.S. Cl.
CPC ....... *F16F 2232/08* (2013.01); *F16F 2234/02* (2013.01)

(56) References Cited

U.S. PATENT DOCUMENTS

| | | | | |
|---|---|---|---|---|
| 5,755,305 | A * | 5/1998 | Deferme | F16F 9/341 188/282.6 |
| 6,644,445 | B2 * | 11/2003 | Dodge | F16F 9/3484 188/282.6 |
| 8,042,661 | B2 * | 10/2011 | Ota | F16F 9/3485 188/322.15 |
| 8,109,372 | B2 * | 2/2012 | Berger | F16F 9/3485 188/322.15 |
| 2004/0129517 | A1 | 7/2004 | Murata | |
| 2009/0236194 | A1 * | 9/2009 | Kim | F16F 9/3485 188/322.15 |
| 2010/0012450 | A1 | 1/2010 | Ji et al. | |
| 2013/0025446 | A1 * | 1/2013 | Ashiba | F16F 9/3485 91/418 |
| 2013/0192457 | A1 | 8/2013 | Ashiba | |
| 2014/0262655 | A1 * | 9/2014 | Tuts | F16F 9/348 188/322.15 |
| 2015/0034182 | A1 | 2/2015 | Ashiba | |
| 2019/0390731 | A1 * | 12/2019 | Nakano | F16F 9/3485 |

FOREIGN PATENT DOCUMENTS

| | | |
|---|---|---|
| DE | 102009033301 A1 | 1/2010 |
| DE | 102013201279 A1 | 8/2013 |
| JP | 03-035341 U | 4/1991 |
| JP | 03-168429 A | 7/1991 |
| JP | 06-280919 A | 10/1994 |
| JP | 11-51105 A | 2/1999 |
| JP | 2002-195335 A | 7/2002 |
| JP | 2003-254372 A | 9/2003 |
| JP | 2004-211878 A | 7/2004 |
| JP | 2013-029133 A | 2/2013 |

OTHER PUBLICATIONS

German Office Action dated Nov. 27, 2020 for the corresponding German Patent Application No. 112017007198.4.
German Office Action dated Oct. 6, 2021 for the corresponding German Patent Application No. 112017007198.4.

\* cited by examiner

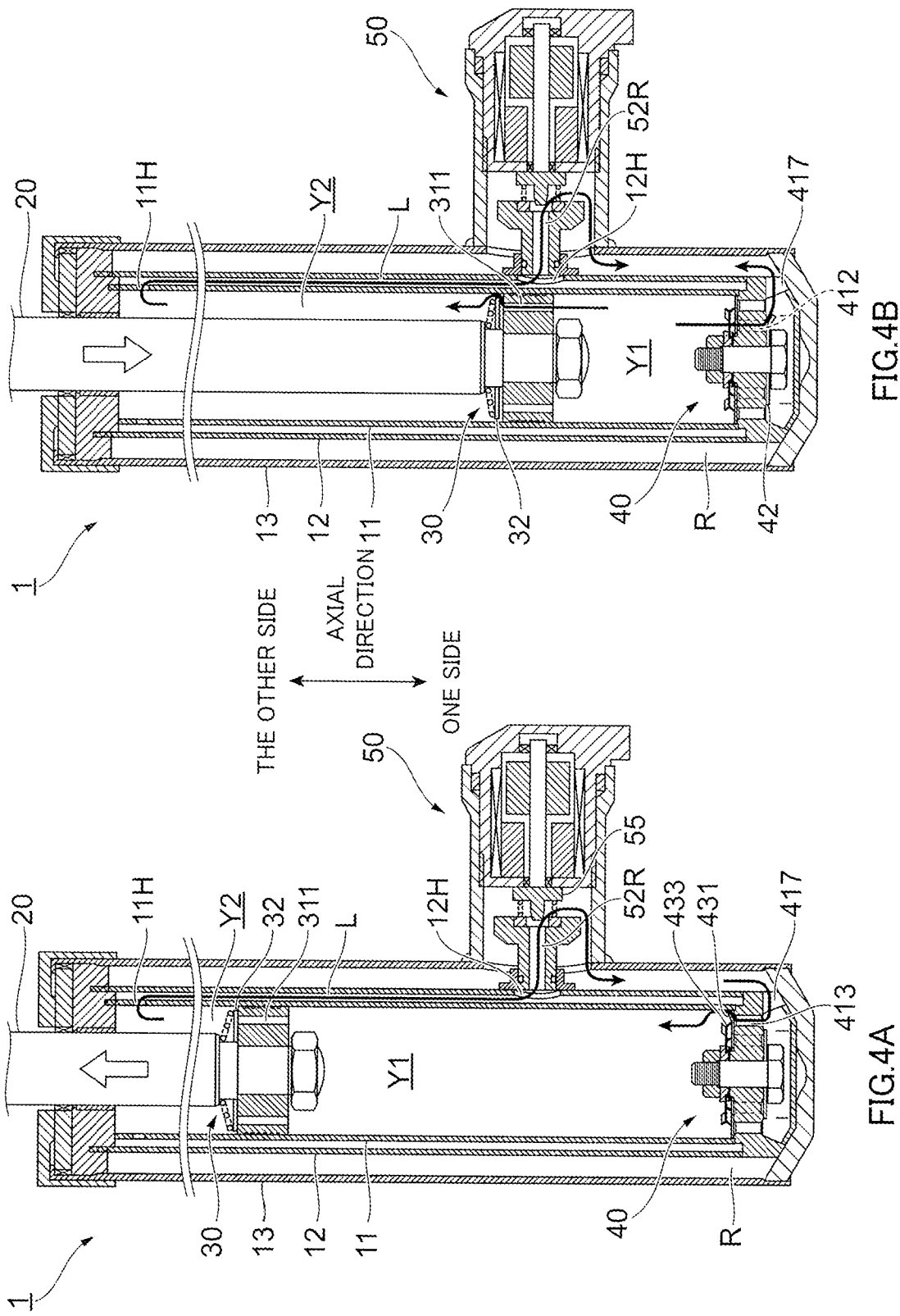

HYDRAULIC DAMPING DEVICE

CROSS-REFERENCE TO RELATED PATENT APPLICATIONS

This application is a U.S. National Phase Application under 35 U.S.C. § 371 of International Patent Application No. PCT/JP2017/017706, filed May 10, 2017, and claims the benefit of Japanese Patent Application No. 2017-045482, filed Mar. 9, 2017, all of which are incorporated herein by reference in their entirety. The International Application was published in Japanese on Sep. 13, 2018 as International Publication No. WO/2018/163443 under PCT Article 21(2).

FIELD OF THE INVENTION

The present invention relates to a hydraulic damping device.

BACKGROUND OF THE INVENTION

There is known a hydraulic damping device that performs damping by fluid. The hydraulic damping device is provided with a valve that controls the flow of fluid. One known example of such a valve controls the flow of fluid by moving the position of the valve (e.g., see Japanese Patent Application Laid-Open Publication No. 2004-211878). Another known example of such a valve controls the flow of fluid by deforming the valve (e.g., see Japanese Patent Application Laid-Open Publication No. 2003-254372).

Technical Problem

When the hydraulic damping device uses a valve that controls the flow of fluid by moving its position, the valve may suddenly move under a large pressure of the fluid and thus contact other components of the hydraulic damping device. This may generate sound. Also, when the hydraulic damping device uses a valve that controls the flow of fluid by its deformation, the valve may wear out.

Objects of the present invention are to prevent occurrence of sound due to fluid control by the valve and to improve durability of the valve.

SUMMARY OF THE INVENTION

Solution to Problem

With these objects in view, the present invention is a hydraulic damping device including: a cylinder storing fluid; a piston configured to form a channel through which the fluid flows along with relative movement of a rod relative to the cylinder in a specific direction; a valve having elasticity, the valve being configured to open and close the channel in the piston; a movement permitting part configured to permit the valve to move between a contact position and a spaced position, the contact position being a position where the valve contacts the piston, the spaced position being a position where the valve is spaced from the piston; a restricting part configured to restrict bending of the valve at the spaced position; and a pressing part having elasticity, the pressing part being configured to press the valve against the piston.

Advantageous Effects of Invention

According to the present invention, it is possible to prevent occurrence of sound due to fluid control by the valve and to improve durability of the valve.

BRIEF DESCRIPTION OF THE DRAWINGS

FIGS. 4A and 4B are explanatory diagrams of how the hydraulic damper of the first embodiment works.

DETAILED DESCRIPTION OF THE INVENTION

Embodiments of the present invention will be described below in detail with reference to the attached drawings.

FIRST EMBODIMENT

Structure and Function of the Hydraulic Damper 1

Figure 1:
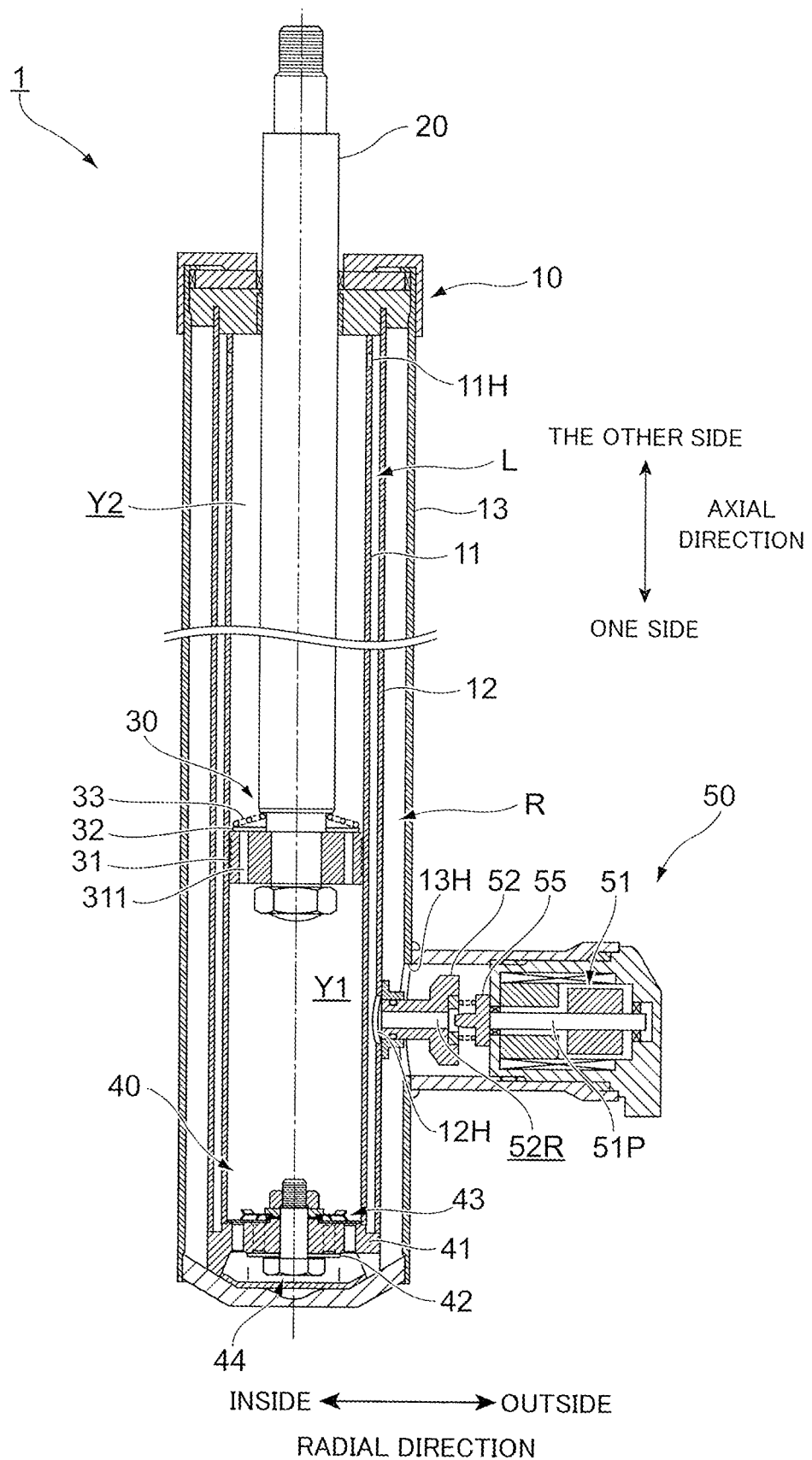
FIG. 1 is an entire view of a hydraulic damper of the first embodiment.

FIG. 1 is an entire view of a hydraulic damper 1 of the first embodiment.

As shown in FIG. 1, the hydraulic damper 1 (an example of the hydraulic damping device) includes a cylinder unit 10 storing oil, and a rod 20. One end of the rod 20 is inserted into the cylinder unit 10 such that the rod 20 can slide within the cylinder unit 10, and the other end of the rod 20 protrudes from the cylinder unit 10. The hydraulic damper 1 further includes a piston unit 30 disposed at the one end of the rod 20, a bottom piston unit 40 disposed at one end of the cylinder unit 10, and a damping force changer 50 disposed outside of the cylinder unit 10 in the radial direction.

In the following description, the longitudinal direction of the hydraulic damper 1 shown in FIG. 1 may be referred to as an "axial direction". The lower side in the axial direction may be referred to as "one side", and the upper side of the hydraulic damper 1 may be referred to as "the other side". Also, the lateral direction of the hydraulic damper 1 shown in FIG. 1 may be referred to as a "radial direction". Further, the side radially closer to the centerline may be referred to as an "inside in the radial direction", and the side radially away from the centerline may be referred to as an "outside in the radial direction". Further, the rotational direction of the hydraulic damper 1 about the axial direction may be referred to as a "circumferential direction".

Structure and Function of the Cylinder Unit 10

The cylinder unit 10 includes a cylinder 11, an outer cylinder body 12 disposed at the outside of the cylinder 11 in the radial direction, and a damper case 13 disposed at the outside of the outer cylinder body 12 in the radial direction.

The cylinder 11 has a cylindrical shape and includes a cylinder opening 11H at the other side.

The outer cylinder body 12 forms a communication path L between the outer cylinder body 12 and the cylinder 11. Also, the outer cylinder body 12 includes an outer cylinder body opening 12H at a position facing the damping force changer 50.

The damper case 13 forms a reservoir chamber R between the damper case 13 and the outer cylinder body 12. The reservoir chamber R retains oil. Along with movement of the rod 20 relative to the cylinder 11, the reservoir chamber R absorbs oil in the cylinder 11 (the first oil chamber Y1) or supplies oil into the cylinder 11 (the first oil chamber Y1). Further, the reservoir chamber R retains oil flowing out of the damping force changer 50. The damper case 13 includes a case opening 13H at a position facing the damping force changer 50.

Structure and Function of the Rod 20

The rod 20 is a rod-like member extending in the axial direction. The rod 20 connects to the piston unit 30 at the one side. Also, the rod 20 connects to a vehicle body at the other side via a coupling member or the like (not shown in the figure).

Structure and Function of the Piston Unit 30

The piston unit 30 includes a piston body 31 having multiple piston oil ports 311, a piston valve 32 opening and closing the other side of the piston oil ports 311, and a spring 33 interposed between the piston valve 32 and the one side end of the rod 20. The piston unit 30 partitions the oil chamber within the cylinder 11 into the first oil chamber Y1 and the second oil chamber Y2.

Structure and Function of the Bottom Piston Unit 40

The bottom piston unit 40 includes a valve seat 41 (an example of the piston), a damping valve unit 42 at the one side of the valve seat 41, a check valve unit 43 at the other side of the valve seat 41, and a fixing member 44 (an example of the holding part) provided in the axial direction. The bottom piston unit 40 provides a partition between the first oil chamber Y1 and the reservoir chamber R.

The valve seat 41, the damping valve unit 42, the check valve unit 43, and the fixing member 44 of the bottom piston unit 40 will be described in detail later.

Structure and Function of the Damping Force Changer 50

The damping force changer 50 includes a solenoid unit 51, a connecting channel member 52, and a solenoid valve 55.

The solenoid unit 51 advances or retracts a plunger 51P according to control by a controller (not shown in the figure).

The connecting channel member 52 is a substantially cylindrical member having a connecting channel 52R inside thereof.

The solenoid valve 55 changes a cross-sectional area of oil flow within the connecting channel 52R by moving the position of the solenoid valve 55 relative to the connecting channel member 52. Thus, the solenoid valve 55 throttles the flow of oil within the connecting channel 52R.

In the first embodiment, damping force in the hydraulic damper 1 is mainly generated by throttling of the oil flow by the solenoid valve 55.

Figure 2:
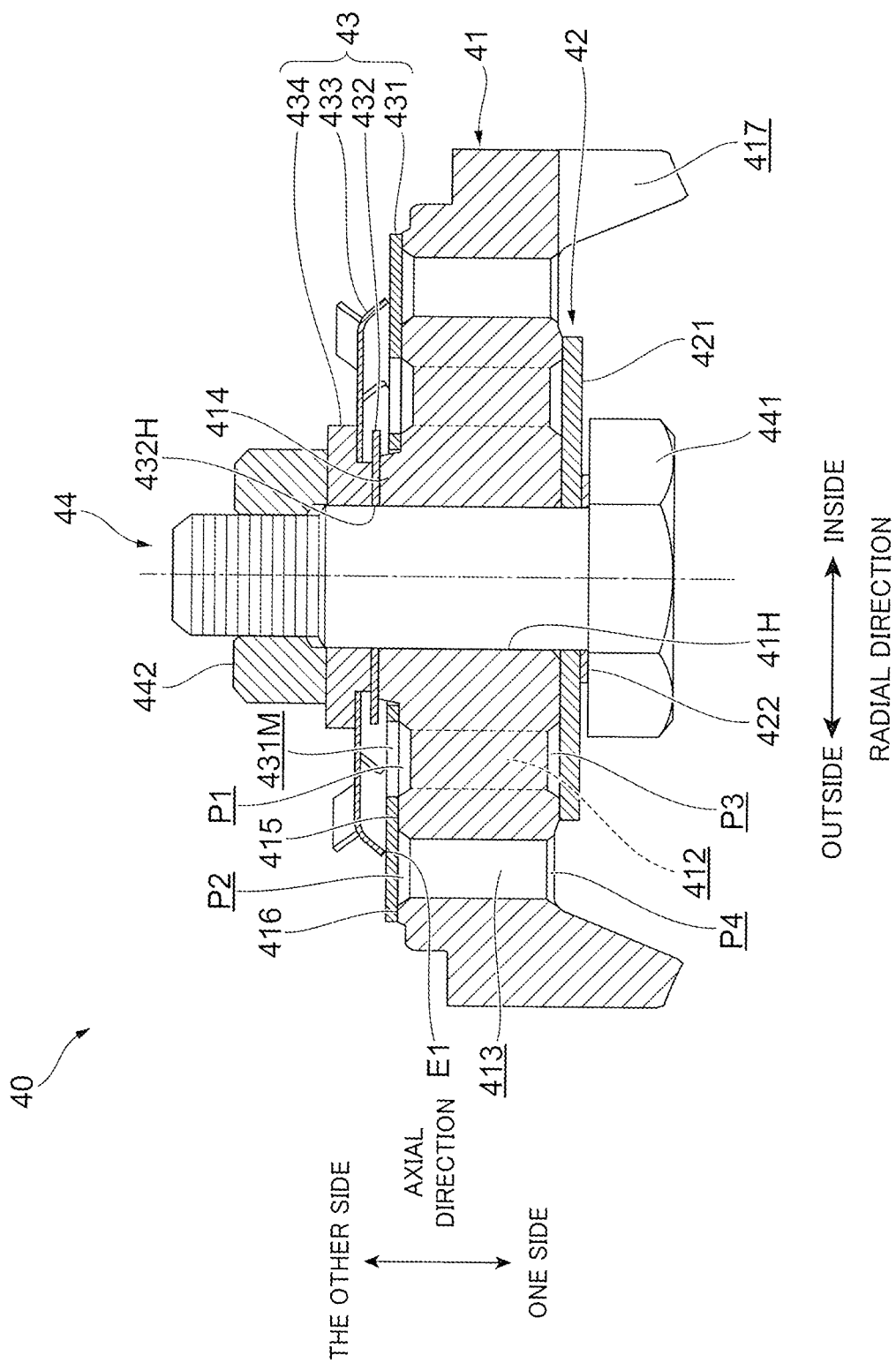
FIG. 2 is a cross-sectional view of a bottom piston unit of the first embodiment.

FIG. 2 is a cross-sectional view of the bottom piston unit 40 of the first embodiment.

Figure 3A:
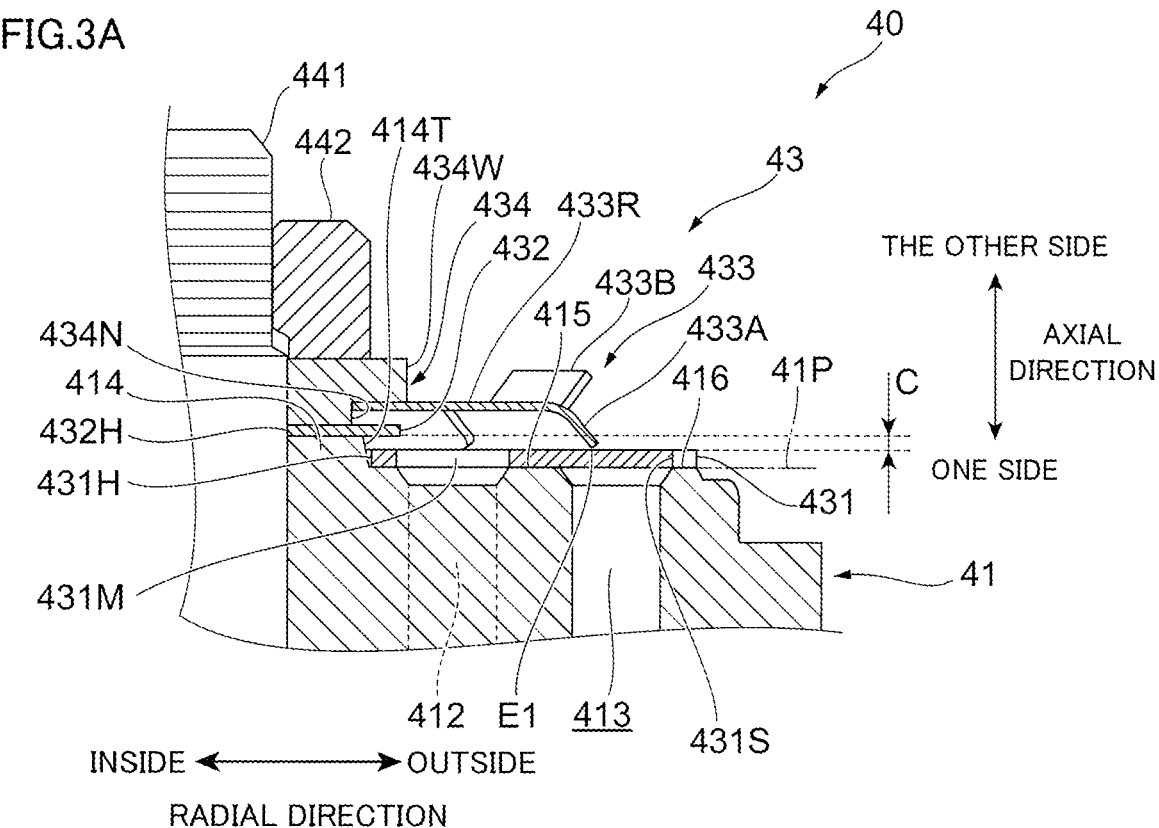
FIG. 3A is a partial cross-sectional view of the bottom piston unit of the first embodiment.
Figure 3B:
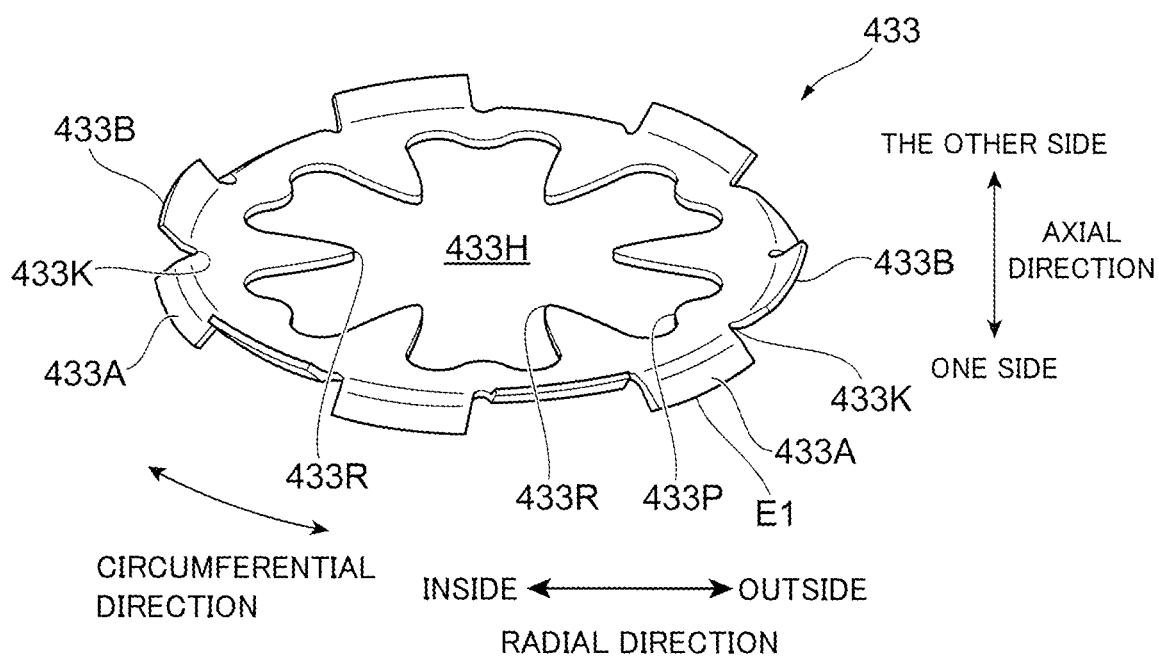
FIG. 3B is a perspective view of a pressing member of the first embodiment.

FIG. 3A is a partial cross-sectional view of the bottom piston unit 40 of the first embodiment, and FIG. 3B is a perspective view of a pressing member 433 of the first embodiment.

Valve Seat 41

As shown in FIG. 2, the valve seat 41 includes a through-hole 41H at the inside in the radial direction, compression-side oil paths 412 at the outside of the through-hole 41H in the radial direction, extension-side oil paths 413 at the outside of the compression-side oil paths 412 in the radial direction. The valve seat 41 further includes a holding structure 414 at the other side, an inner round part 415 (an example of the inner annular part) at the other side, and an outer round part 416 (an example of the outer annular part) at the other side. The valve seat 41 further includes a reservoir channel part 417 at the one side.

The through-hole 41H extends in the radial direction of the valve seat 41. The through-hole 41H allows for insertion of the fixing member 44.

Multiple (four in the present embodiment) compression-side oil paths 412 are arranged at substantially equal intervals in a circumferential direction. Each compression-side oil path 412 includes a first other-side oil port P1 at its end on the other side and a first one-side oil port P3 at its end on the one side.

Each compression-side oil path 412 permits flow of oil between the first oil chamber Y1 and the reservoir chamber R during a compression stroke of the hydraulic damper 1 (see FIG. 1).

Multiple (four in the present embodiment) extension-side oil paths 413 are arranged at substantially equal intervals in the circumferential direction. Each extension-side oil path 413 includes a second other-side oil port P2 (an example of the port) at its end on the other side and a second one-side oil port P4 at its end on the one side.

Each extension-side oil path 413 permits flow of oil between the reservoir chamber R and the first oil chamber Y1 during an extension stroke of the hydraulic damper 1 (see FIG. 1).

The holding structure 414 (an example of the movement permitting part) is formed substantially annularly around an outer periphery of the through-hole 41H. The holding structure 414 protrudes to the other side in the axial direction. The holding structure 414 forms a space (gap C described later) that permits the check valve 431 to move in the axial direction.

As shown in FIG. 3A, a side 414T of the holding structure 414 of the first embodiment is tapered. Specifically, the holding structure 414 has an outer diameter gradually narrowing from the one side toward the other side. In the first embodiment, this allows the check valve 431 to smoothly move in the axial direction.

The inner round part 415 is annularly formed at the outside of the first other-side oil ports P1 in the radial direction and at the inside the second other-side oil ports P2 in the radial direction (see FIG. 2). The inner round part 415 protrudes to the other side in the axial direction. The inner round part 415 of the first embodiment forms a contact area with the check valve 431 (described later). Additionally, the inner round part 415 works with the check valve 431 (described later) to prevent flow of oil between the first other-side oil port P1 and the second other-side oil port P2 (see FIG. 2).

The outer round part 416 is annularly formed at the outside of the second other-side oil ports P2 in the radial direction (see FIG. 2). The outer round part 416 protrudes to the other side in the axial direction. The height of protrusion of the outer round part 416 in the axial direction is slightly higher than that of the inner round part 415. The outer round part 416 forms a contact area with the check valve 431 (described later).

In the first embodiment, the plane passing through the inner round part 415 and the outer round part 416 is referred to as a round plane 41P.

The reservoir channel part 417 is an opening formed at the one side end. The reservoir channel part 417 faces the first one-side oil ports P3, the damping valve unit 42, and the second one-side oil ports P4 at the inside in the radial direction. Also, the reservoir channel part 417 communicates with the reservoir chamber R (see FIG. 1) at the outside in the radial direction.

Damping Valve Unit 42

As shown in FIG. 2, the damping valve unit 42 includes a damping valve 421 and a compression-side seat ring 422 at the one side of the damping valve 421.

The damping valve 421 is a disk-like metal plate through which the fixing member 44 penetrates at the inside in the radial direction. The outer periphery of the damping valve 421 is positioned at the outside of the first one-side oil ports P3 in the radial direction and at the inside of the second one-side oil ports P4 in the radial direction.

In the first embodiment, the damping valve 421 has a thickness larger than a thickness of the check valve 431 (described later).

The damping valve 421 configured as above opens and closes the first one-side oil ports P3, and leaves the second one-side oil ports P4 always open.

The compression-side seat ring 422 is a disk-like metal plate through which the fixing member 44 penetrates at the inside in the radial direction. The compression-side seat ring 422 has an outer diameter smaller than that of the damping valve 421. The compression-side seat ring 422 secures a space for deformation of the damping valve 421 to the one side.

The damping valve 421 may be comprised of multiple (e.g., three) metal plates. In this case too, the total thickness of the damping valve 421 is made larger than the thickness of the check valve 431 (described later).

Check Valve Unit 43

As shown in FIG. 3A, the check valve unit 43 includes the check valve 431 (an example of the valve) at the other side of the valve seat 41, a check valve stopper 432 (an example of the restricting part) at the other side of the check valve 431, a pressing member 433 (an example of the pressing part) at the other side of the check valve stopper 432, and a collar member 434 (an example of the supporting part) at the other side of the pressing member 433.

The check valve 431 is a disk-like metal plate including an opening 431H at the inside in the radial direction. The opening 431H allows for insertion of the holding structure 414. The outer periphery of the check valve 431 is located above the outer round part 416.

The outer periphery of the check valve 431 may be located at the outside of the outer round part 416 in the radial direction.

As shown in FIG. 3A, the check valve 431 includes check valve oil ports 431M at the outside of the opening 431H in the radial direction, and a slit 431S at the outside of the check valve oil ports 431M in the radial direction.

The check valve oil ports 431M are formed at positions radially corresponding to the respective first other-side oil port P1. Multiple check valve oil ports 431M are provided. The check valve oil ports 431M face the respective first other-side oil ports P1.

The slit 431S is formed by cutting out the outer periphery of the check valve 431 to the inside in the radial direction. The slit 431S faces the outer round part 416. When the rod 20 moves during an extension stroke so slowly that the check valve 431 does not deform entirely and keeps the second other-side oil ports P2 almost closed, the slit 431S permits flow of oil through the extension-side oil paths 413.

The check valve 431 configured as above opens and closes the second other-side oil ports P2, and leaves the first other-side oil ports P1 always open. The check valve 431 of the first embodiment restricts flow of oil through the extension-side oil paths 413 during movement of the rod 20 to the one side, and permits flow of oil through the extension-side oil paths 413 during movement of the rod 20 to the other side.

In the hydraulic damper 1 of the first embodiment, the check valve 431 serves as a member to switch flow of oil through the extension-side oil paths 413, and is not particularly intended to generate a damping force.

As shown in FIG. 3A, the check valve stopper 432 is a substantially annular disk-like metal plate including an opening 432H at the inside in the radial direction. The opening 432H allows for insertion of the fixing member 44. The check valve stopper 432 has a larger outer diameter than that of the holding structure 414. The check valve stopper 432 hence protrudes to the outside in the radial direction relative to the holding structure 414.

The check valve stopper 432 is spaced from the round plane 41P of the valve seat 41 with a predetermined gap C in the axial direction. This allows the check valve 431 to move between a contact position contacting the round plane 41P and a spaced position spaced from the round plane 41P.

The check valve stopper 432 restricts bending of the check valve 431 at the spaced position away from the round plane 41P.

In the first embodiment, the contact position refers to a position where the entire check valve 431 contacts the round plane 41P, and the spaced position refers to a position where the entire check valve 431 is away from the round plane 41P.

Movement of the check valve 431 may be regarded as displacement of the check valve 431 as a whole in the axial direction. Movement of the check valve 431 may further be regarded as displacement of the check valve 431 without involving its deformation.

Deformation of the check valve 431 may be regarded as deformation of its radially outward portion (at least including the portion facing the second other-side oil port P2) with its radially inward portion (the portion closer to the opening 432H) being situated at the spaced position.

As shown in FIG. 3B, the pressing member 433 includes an opening 433H at the inside in the radial direction to allow for insertion of the fixing member 44 and the collar member 434. The pressing member 433 has elasticity. The pressing member 433 may be made of metal, such as iron.

The pressing member 433 includes first outer protrusions 433A, second outer protrusions 433B, held parts 433R, and inner protrusions 433P.

The first outer protrusions 433A (examples of the protrusion) protrude to the outside in the radial direction and to the one side. Multiple first outer protrusions 433A are arranged at substantially equal intervals in the circumferential direction. The first outer protrusions 433A contact the other side surface of the check valve 431 at their contacting ends E1 (see FIG. 3A).

As shown in FIG. 3A, in the first embodiment, the contacting ends E1 of the first outer protrusions 433A of the pressing member 433 contact the check valve 431 at an area that is outside of the inner round part 415 in the radial direction and inside of the outer round part 416 in the radial direction.

The second outer protrusions 433B protrude to the outside in the radial direction and to the other side. Multiple second outer protrusions 433B are arranged at substantially equal intervals in the circumferential direction. In the first embodiment, each of the second outer protrusions 433B has a free end that does not contact other components.

In the first embodiment, the first outer protrusions 433A and the second outer protrusions 433B are symmetrical to each other. This ensures that the pressing member 433 can work in the same manner even if the pressing member 433 is assembled upside down from how the pressing member 433 is assembled in the first embodiment.

The first outer protrusions 433A and the second outer protrusions 433B are alternately arranged in the circumferential direction. A notch 433K is formed between the adjacent first outer protrusion 433A and second outer protrusion 433B.

The held parts 433R protrude to the inside in the radial direction. Each held part 433R is tapered such that its circumferential width narrows from the outside in the radial direction toward the inside in the radial direction. Multiple held parts 433R are arranged at substantially equal intervals in the circumferential direction. Radially inward portions of the respective held parts 433R are held between the check valve stopper 432 and the collar member 434.

Each held part 433R is positioned to face the corresponding notch 433K. Specifically, each held part 433R is aligned with the corresponding notch 433K in the radial direction.

The inner protrusions 433P protrude to the inside in the radial direction. Projection amount of the inner protrusions 433P is smaller than that of the held parts 433R.

Each inner protrusion 433P is located at a position facing the corresponding notch 433K. Specifically, each inner protrusion 433P is aligned with the corresponding notch 433K in the radial direction.

In the pressing member 433 of the first embodiment, the held parts 433R and the inner protrusions 433P are positioned to face the respective notches 433K each between the adjacent first outer protrusion 433A and second outer protrusion 433B. This reduces stress concentration in the notches 433K.

As shown in FIG. 3A, the collar member 434 includes a small diameter portion 434N and a large diameter portion 434W at the other side of the small diameter portion 434N. The collar member 434 is a separate component from a nut 442 (described later) of the fixing member 44.

The small diameter portion 434N contacts the check valve stopper 432 at the one side. The small diameter portion 434N also contacts the held parts 433R of the pressing member 433 in the radial direction. The small diameter portion 434N thus defines the position of the pressing member 433 in the radial direction.

The large diameter portion 434W protrudes to the outside in the radial direction further than the small diameter portion 434N. The large diameter portion 434W contacts the other side of the held parts 433R of the pressing member 433.

The collar member 434 of the first embodiment is configured such that its holding amount of the held parts 433R of the pressing member 433 in the radial direction is variable depending the outer diameter of the large diameter portion 434W. This allows to easily change the spring rate of the pressing member 433 by using a collar member 434 having a differently-sized large diameter portion 434W.

Fixing Member 44

As shown in FIG. 2, the fixing member 44 includes a bolt 441 at the one side and a nut 442 at the other side. The fixing member 44 fixes the damping valve unit 42 and the check valve unit 43 to the valve seat 41.

Operation of the Hydraulic Damper 1

FIGS. 4A and 4B are explanatory diagrams of how the hydraulic damper 1 of the first embodiment works. FIG. 4A depicts oil flow during extension of the hydraulic damper 1, and FIG. 4B depicts oil flow during compression of the hydraulic damper 1.

First, an explanation will be given of operation of the hydraulic damper 1 during its extension.

As shown in FIG. 4A, during extension of the hydraulic damper 1, the rod 20 moves to the other side relative to the cylinder 11. At this time, the piston valve 32 continues to close the piston oil ports 311. Further, the movement of the piston unit 30 to the other side reduces the volume of the second oil chamber Y2. As a result, the oil in the second oil chamber Y2 flows out through the cylinder opening 11H into the communication path L.

Then, the oil goes through the communication path L, the outer cylinder body opening 12H, and the connecting channel 52R to flow into the damping force changer 50. In the damping force changer 50, the oil flow within the connecting channel 52R is throttled by the solenoid valve 55. This throttling of the oil flow by the solenoid valve 55 generates a damping force. Thereafter, the oil flows out into the reservoir chamber R.

Also, pressure inside the first oil chamber Y1 becomes relatively lower than that inside the reservoir chamber R. For this reason, oil within the reservoir chamber R flows into the extension-side oil paths 413 of the bottom piston unit 40.

At this time, the check valve 431 of the first embodiment moves to the other side against the spring force of the pressing member 433 (see FIG. 3A). The check valve 431 further bends from the outside to the inside in the radial direction. In this way, the check valve 431 not only moves in the axial direction but also bends in opening the extension-side oil paths 413. The oil then flows into the first oil chamber Y1.

As described above, the check valve 431 not only moves in the axial direction but also bends. Thus, the stress on the check valve 431 is divided into one that causes the check valve 431 to move along with deformation of the pressing member 433, and another one that causes the check valve 431 itself to bend. As a result, the check valve 431 does not move so suddenly as in the case where the check valve 431 only moves without bending itself. This reduces noise accompanying movement of the check valve 431. Also, as compared to the case where the check valve 431 only moves without bending itself, durability of the check valve 431 improves.

Then, an explanation will be given of operation of the hydraulic damper 1 during its compression.

As shown in FIG. 4B, during compression of the hydraulic damper 1, the rod 20 moves to the one side relative to the cylinder 11. In the piston unit 30, pressure difference between the first oil chamber Y1 and the second oil chamber Y2 causes the piston valve 32 to open the piston oil ports 311. Thus, the oil within the first oil chamber Y1 flows out through the piston oil ports 311 into the second oil chamber Y2. Here, the rod 20 is present within the second oil chamber Y2. For this reason, the oil flowing from the first oil chamber Y1 into the second oil chamber Y2 is excessive in the amount equal to the volume of the rod 20 within the second oil chamber Y2. Accordingly, the oil in the amount equal to the volume of the rod 20 within the second oil chamber Y2 flows out through the cylinder opening 11H into the communication path L.

Then, the oil goes through the communication path L, the outer cylinder body opening 12H, and the connecting channel 52R to flow into the damping force changer 50. The oil flow within the damping force changer 50 is the same as that during extension of the hydraulic damper 1 as described above.

Also, as a result of the rod 20 moving to the one side relative to the cylinder 11, the oil within the first oil chamber Y1 flows into the compression-side oil paths 412 through the opening 433H of the pressing member 433 and the check valve oil ports 431M (see FIG. 2) in the bottom piston unit 40. The oil having flowed into the compression-side oil paths 412 opens the damping valve 421. The oil then flows out into the reservoir chamber R. That is, depending on the pressure inside the first oil chamber Y1, damping force is generated by both of the oil flow through the cylinder opening 11H into the damping force changer 50 and the oil flow in the bottom piston unit 40.

In particular, the pressing member 433 acts such that, when the hydraulic damper 1 transitions from an extension stroke to a compression stroke, the check valve 431 having been opened during the extension stroke can immediately close the second other-side oil ports P2 at the transition to the compression stroke. This quickly produces a damping force at the initial phase of the compression stroke (in other words, so-called "rising" of the damping force is made faster).

In the first embodiment, the pressing member 433 contacts the check valve 431 at the area outside of the inner round part 415 in the radial direction and inside of the outer round part 416 in the radial direction. This allows the check valve 431 to tightly contact both of the inner round part 415 and the outer round part 416, preventing leakage of oil.

To adjust the damping force by the damping force changer 50, the solenoid valve 55 is controlled by the solenoid unit 51 (see FIG. 1). Specifically, distance between the solenoid valve 55 and the connecting channel member 52 is changed by the solenoid unit 51. As the distance between the solenoid valve 55 and the connecting channel member 52 narrows, the oil flow resistance increases, producing a larger damping force. On the other hand, as the distance between the solenoid valve 55 and the connecting channel member 52 widens, the oil flow resistance decreases, producing a smaller damping force.

SECOND EMBODIMENT

Figure 5:
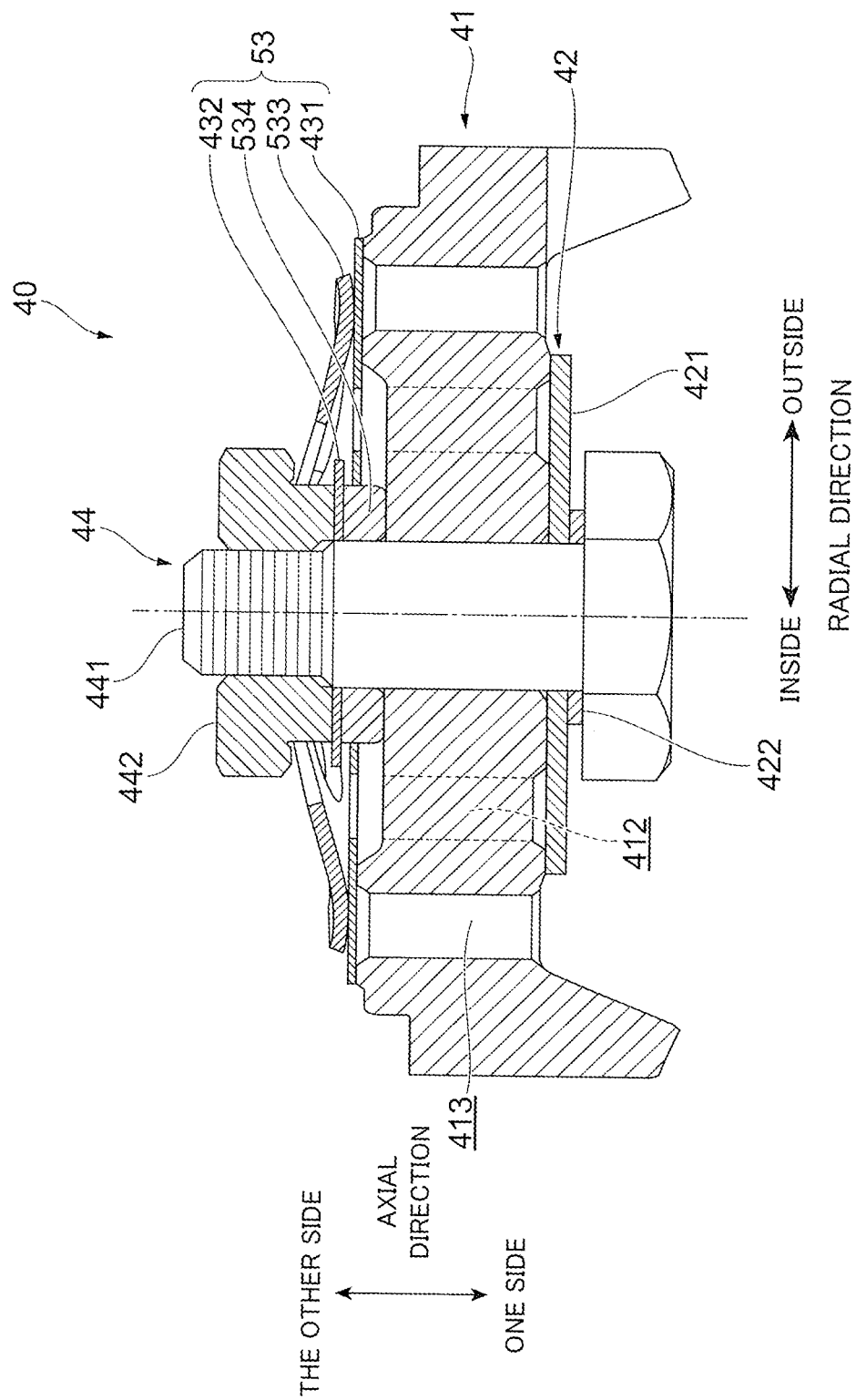
FIG. 5 is an explanatory diagram of the hydraulic damper of the second embodiment.

FIG. 5 is an explanatory diagram of the hydraulic damper 1 of the second embodiment.

Figure 6A:
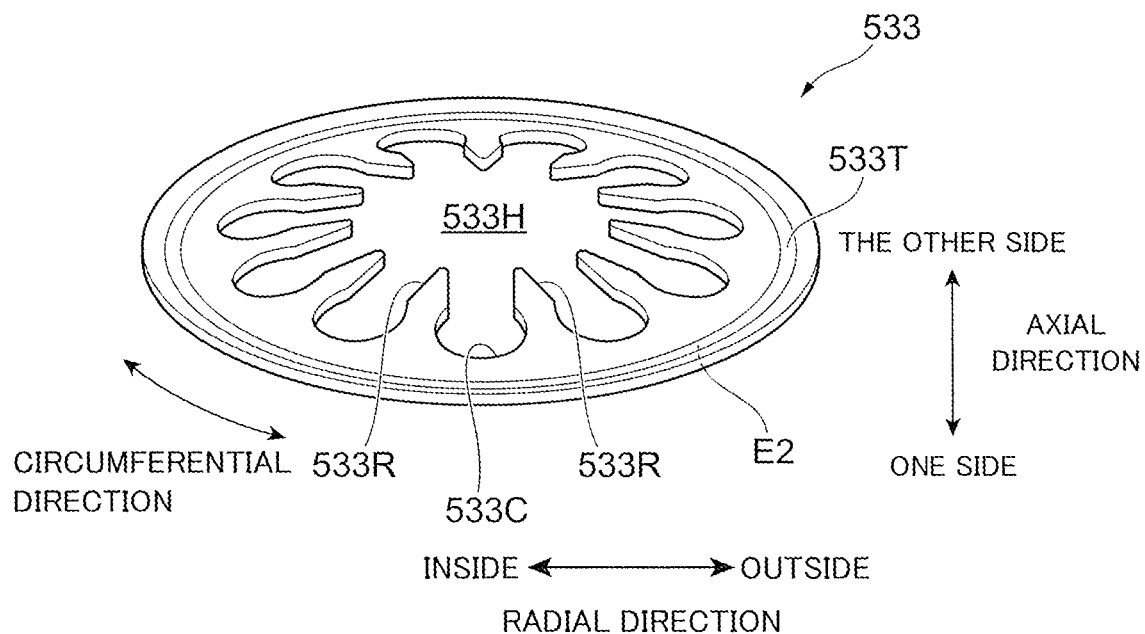
FIGS. 6A and 6B are explanatory diagrams of a check valve unit of the second embodiment.
Figure 6B:
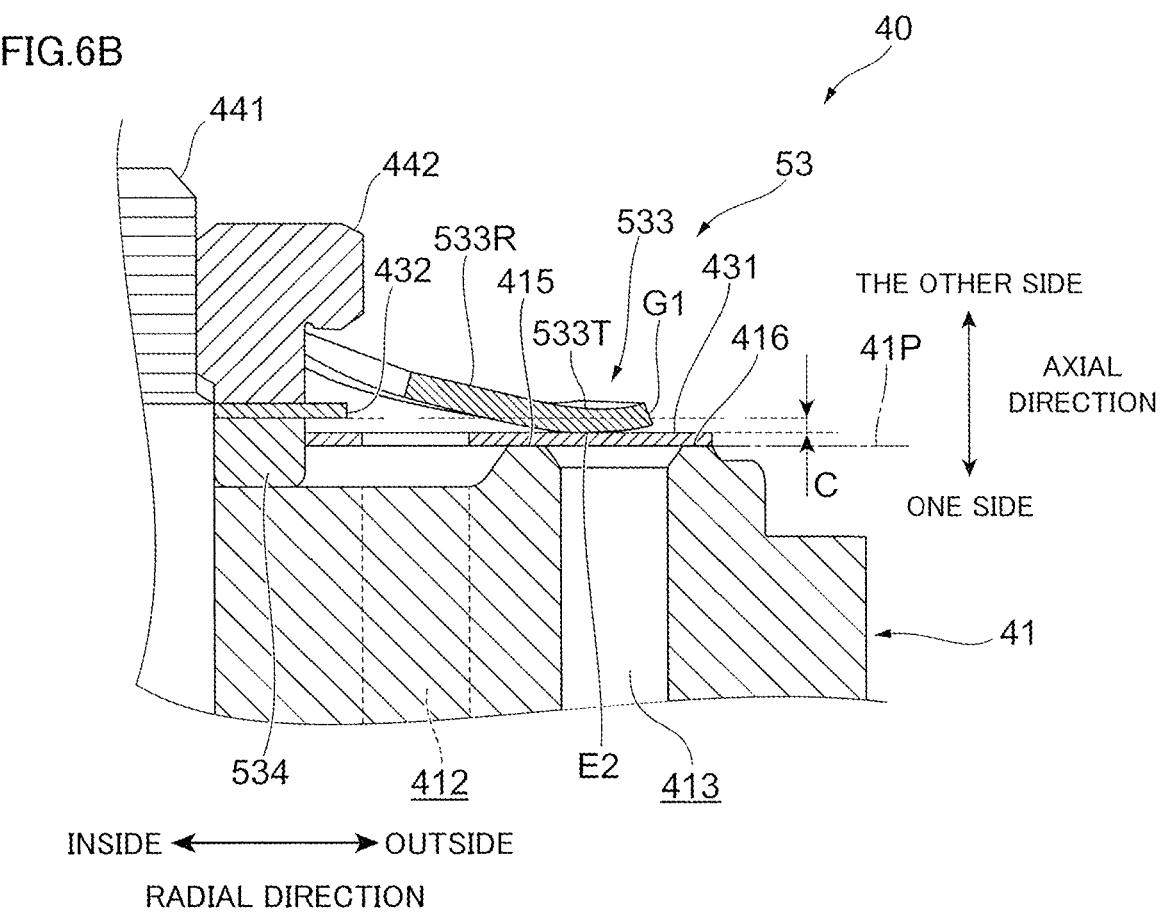

FIGS. 6A and 6B are explanatory diagrams of a check valve unit 53 of the second embodiment, where FIG. 6A is a perspective view of a second pressing member 533 of the second embodiment, and FIG. 6B is a partial cross-sectional view of the bottom piston unit 40 of the second embodiment.

In the second embodiment, similar components to those in the first embodiment are denoted by the same reference numerals, and detailed explanation thereof will be omitted.

Difference of the hydraulic damper 1 of the second embodiment from that of the first embodiment lies in the structure of a check valve unit 53 of the bottom piston unit 40.

As shown in FIG. 5, the check valve unit 53 of the bottom piston unit 40 of the second embodiment includes the check valve 431, the check valve stopper 432, the second pressing member 533 at the other side of the check valve stopper 431, and a spacer member 534 at the one side of the check valve stopper 432.

As shown in FIG. 6A, the second pressing member 533 includes an opening 533H at the inside in the radial direction. The opening 533H allows for insertion of the fixing member 44. The second pressing member 533 has elasticity. The second pressing member 533 may be made of metal, such as iron.

The second pressing member 533 includes an annular contacting part 533T and held parts 533R.

As shown in FIG. 6B, the annular contacting part 533T contacts the other side surface of the check valve 431 at its contacting end E2. An outer periphery G1 of the annular contacting part 533T is located farther from the contacting end E2 relative to the check valve 431 in the axial direction.

As shown in FIG. 6A, the held parts 533R protrude to the inside in the radial direction and to the other side. Each held part 533R is tapered such that its circumferential width narrows from the outside in the radial direction toward the inside in the radial direction. Multiple held parts 533R are arranged at substantially equal intervals in the circumferential direction. Radially inward portions of the respective held parts 533R rest on the nut 442 (see FIG. 6B).

An arc portion 533C having a substantially arc shape is formed between two adjacent held parts 533R.

As shown in FIG. 6B, in the second embodiment, the contacting end E2 of the annular contacting part 533T of the second pressing member 533 is located in an area that is outside of the inner round part 415 in the radial direction and inside of the outer round part 416 in the radial direction.

As shown in FIG. 6B, the spacer member 534 (an example of the movement permitting part) is a separate member at least separable from the check valve 431 and the second pressing member 533. The spacer member 534 is interposed between the valve seat 41 and the check valve stopper 432. The spacer member 534 of the second embodiment positions the check valve stopper 432 at the other side of the round plane 41P. That is, the spacer member 534 forms a space (gap C) in which the check valve 431 can move in the axial direction.

In the second embodiment, the spacer member 534 is a separate member from the valve seat 41. This allows to easily adjust a moving range (i.e. the size of the gap C) of the check valve 431 in the axial direction by changing the axial thickness of the spacer member 534.

With the above configuration, the check valve 431 of the bottom piston unit 40 of the second embodiment does not move suddenly. This can suppress noise caused by contact with other components. Durability of the check valve 431 also improves.

THIRD EMBODIMENT

Figure 7A:
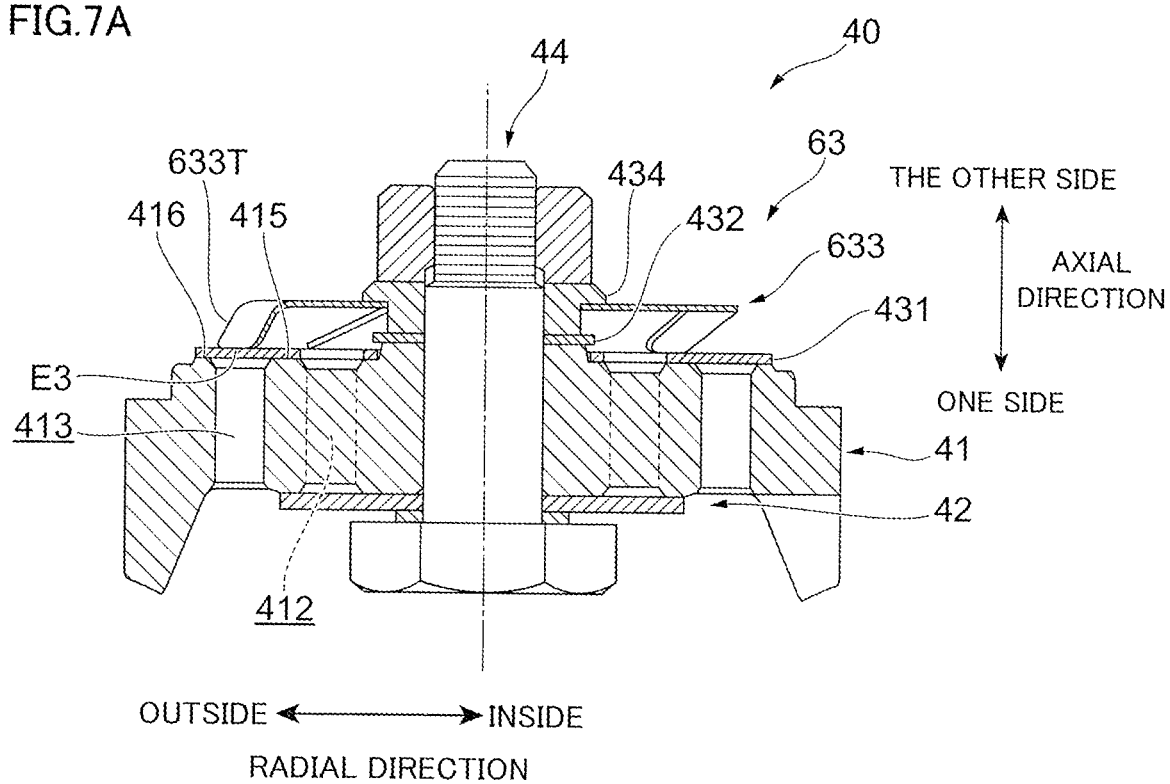
FIGS. 7A and 7B are explanatory diagrams of the hydraulic damper of the third embodiment.
Figure 7B:
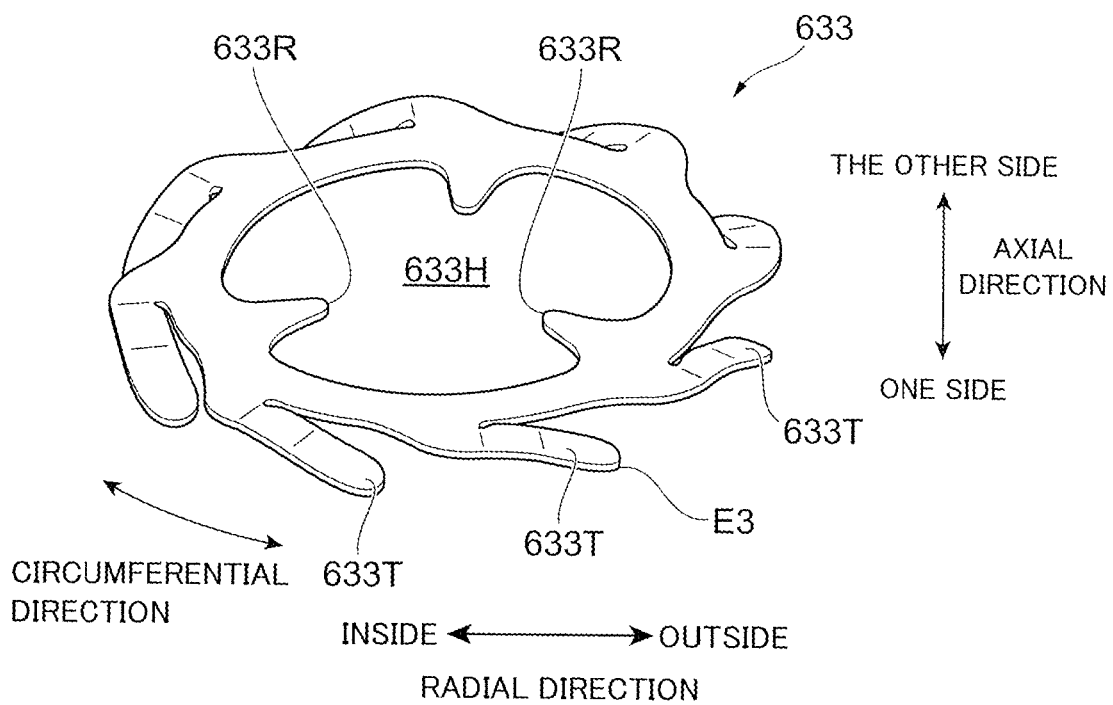

FIGS. 7A and 7B are explanatory diagrams of the hydraulic damper 1 of the third embodiment.

In the third embodiment, similar components to those in the other embodiments are denoted by the same reference numerals, and detailed explanation thereof will be omitted.

Difference of the hydraulic damper 1 in the third embodiment from that in the other embodiments lies in the structure of a check valve unit 63 of the bottom piston unit 40.

As shown in FIG. 7A, the check valve unit 63 of the third embodiment includes the check valve 431, the check valve stopper 432, a third pressing member 633 at the other side, and the collar member 434.

As shown in FIG. 7B, the third pressing member 633 includes an opening 633H at the inside in the radial direction. The opening 633H allows for insertion of the fixing member 44 and the collar member 434. The third pressing member 633 has elasticity. The third pressing member 633 may be made of metal, such as iron.

The third pressing member 633 includes circumferential contacting parts 633T and held parts 633R.

The circumferential contacting parts 633T circumferentially protrude to the one side. Multiple circumferential contacting parts 633T are arranged at substantially equal intervals in the circumferential direction. The circumferential contacting parts 633T contact the other side surface of the check valve 431 at their contacting ends E3 (see FIG. 7A).

As shown in FIG. 7A, in the third embodiment, the contacting ends E3 of the circumferential contacting parts 633T of the third pressing member 633 are located in an area that is outside of the inner round part 415 in the radial direction and inside of the outer round part 416 in the radial direction.

The held parts 633R protrude to the inside in the radial direction. Each held part 633R is tapered such that its circumferential width narrows from the outside in the radial direction toward the inside in the radial direction. Multiple held parts 633R are arranged at substantially equal intervals in the circumferential direction. Radially inward portions of the respective held parts 633R rest on the collar member 434 (see FIG. 7A).

With the above configuration, the bottom piston unit 40 of the third embodiment can suppress noise caused by movement of the check valve 431. Durability of the check valve 431 also improves.

FOURTH EMBODIMENT

Figure 8A:
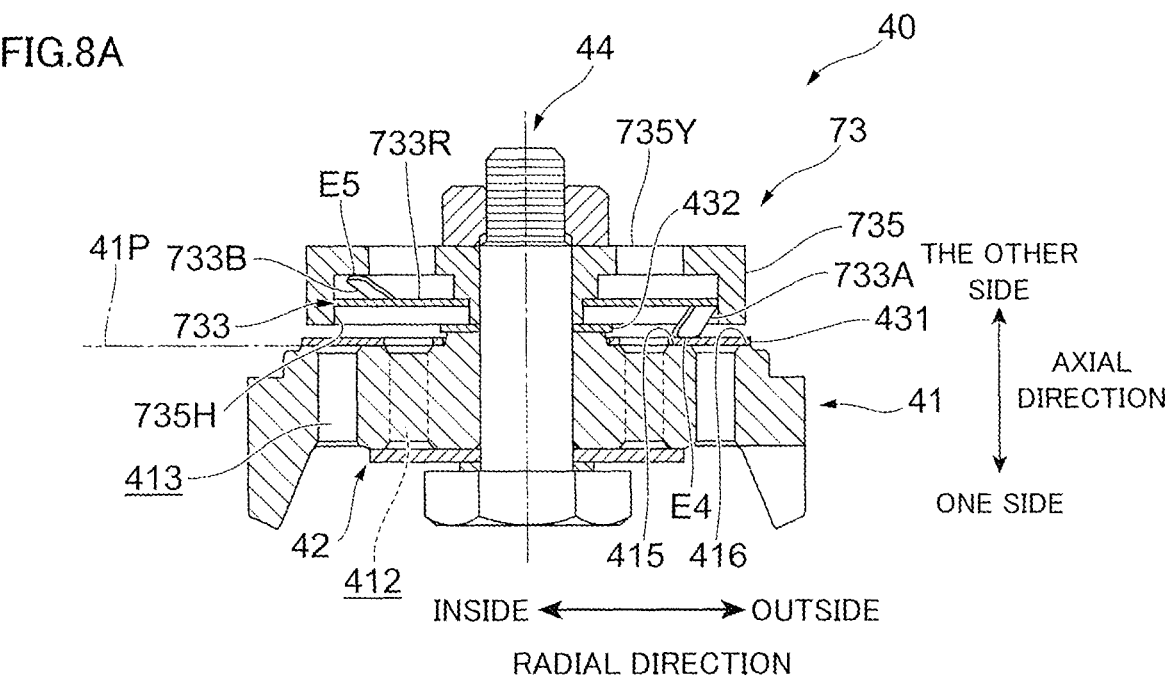
FIGS. 8A to 8C are explanatory diagrams of the hydraulic damper of the fourth embodiment.
Figure 8B:
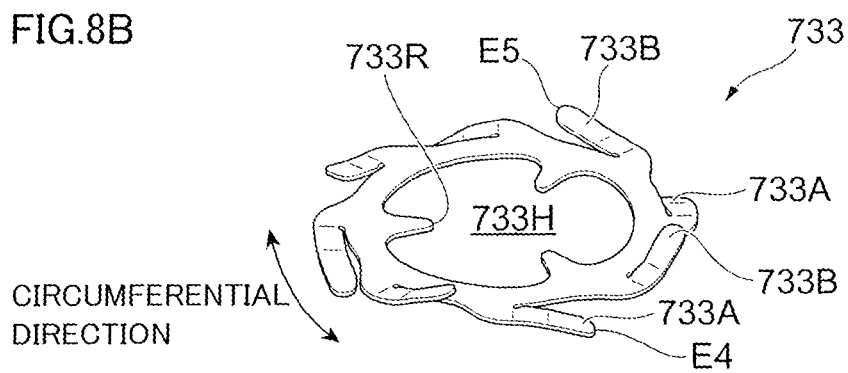
Figure 8C:
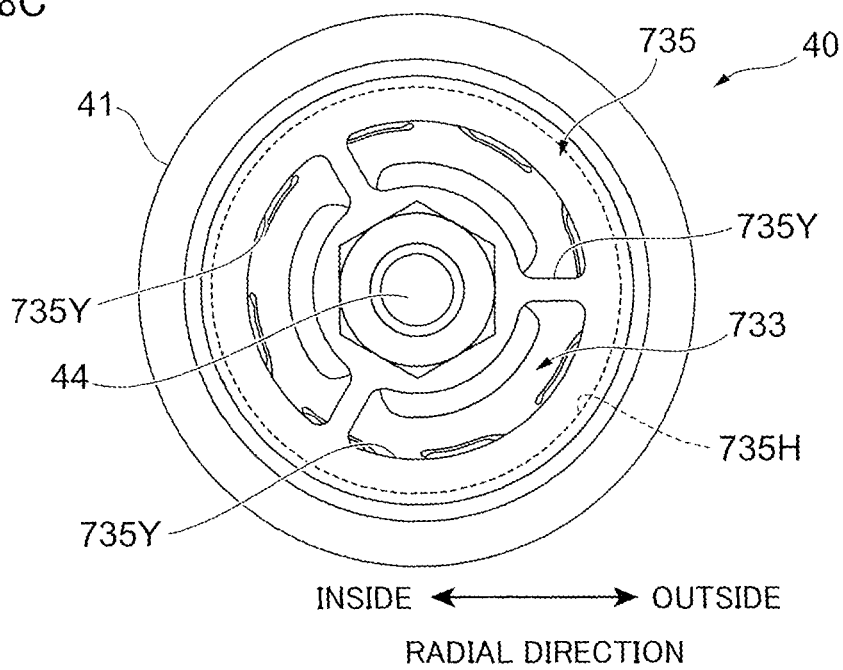

FIGS. 8A to 8C are explanatory diagrams of the hydraulic damper 1 of the fourth embodiment.

In the fourth embodiment, similar components to those in the other embodiments are denoted by the same reference numerals, and detailed explanation thereof will be omitted.

Difference of the hydraulic damper 1 in the fourth embodiment from that in the other embodiments lies in the structure of a check valve unit 73 of the bottom piston unit 40.

As shown in FIG. 8A, the check valve unit 73 of the fourth embodiment includes the check valve 431, the check valve stopper 432, a fourth pressing member 733 at the other side of the check valve stopper 432, and a receiving member 735 at the other side of the check valve stopper 432.

As shown in FIG. 8B, the fourth pressing member 733 includes an opening 733H at the inside in the radial direction. The opening 733H allows for insertion of the fixing member 44 and the receiving member 735. The fourth pressing member 733 has elasticity. The fourth pressing member 733 may be made of metal, such as iron.

The fourth pressing member 733 includes first circumferential contacting parts 733A, second circumferential contacting parts 733B, and held parts 733R.

The first circumferential contacting parts 733A circumferentially protrude to the one side. Multiple first circumferential contacting parts 733A are arranged at substantially equal intervals in the circumferential direction. The first circumferential contacting parts 733A contact the other side surface of the check valve 431 at their contacting ends E4 (see FIG. 8A).

As shown in FIG. 8A, in the fourth embodiment, the contacting ends E4 of the first circumferential contacting parts 733A of the fourth pressing member 733 are located in an area that is outside of the inner round part 415 in the radial direction and inside of the outer round part 416 in the radial direction.

As shown in FIG. 8B, the second circumferential contacting parts 733B circumferentially protrude to the other side. Multiple second circumferential contacting parts 733B are arranged at substantially equal intervals in the circumferential direction. The second circumferential contacting parts 733B contact the receiving member 735 at their contacting ends E5.

The held parts 733R protrude to the inside in the radial direction. Each held part 733R is tapered such that its circumferential width narrows from the outside in the radial direction toward the inside in the radial direction. Multiple held parts 733R are arranged at substantially equal intervals in the circumferential direction. Radially inward portions of the respective held parts 733R rest on the receiving member 735.

As shown in FIG. 8C, the receiving member 735 (an example of the contacting member) includes a pressing member accommodation part 735H and multiple oil ports 735Y. The receiving member 735 prevents the check valve 431 from bending more than a certain limit.

As shown in FIG. 8A, the pressing member accommodation part 735H holds the fourth pressing member 733 so as to radially cover the fourth pressing member 733 from the other side. The other side of the pressing member accommodation part 735H contacts the second circumferential contacting parts 733B of the fourth pressing member 733. The one side of the pressing member accommodation part 735H is spaced from the round plane 41P by a predetermined distance.

The oil ports 735Y are formed on the other side of the receiving member 735 and permit flow of oil through the receiving member 735 in the axial direction.

With the above configuration, the bottom piston unit 40 of the fourth embodiment can suppress noise caused by movement of the check valve 431. Durability of the check valve 431 also improves.

Additionally, in the fourth embodiment, the fourth pressing member 733 is pressed by the receiving member 735 from the other side. This ensures a stable generation of the reaction force of the fourth pressing member 733. Further, the check valve 431 is prevented from bending more than a certain limit once the bending amount reaches the limit.

FIFTH EMBODIMENT

Figure 9A:
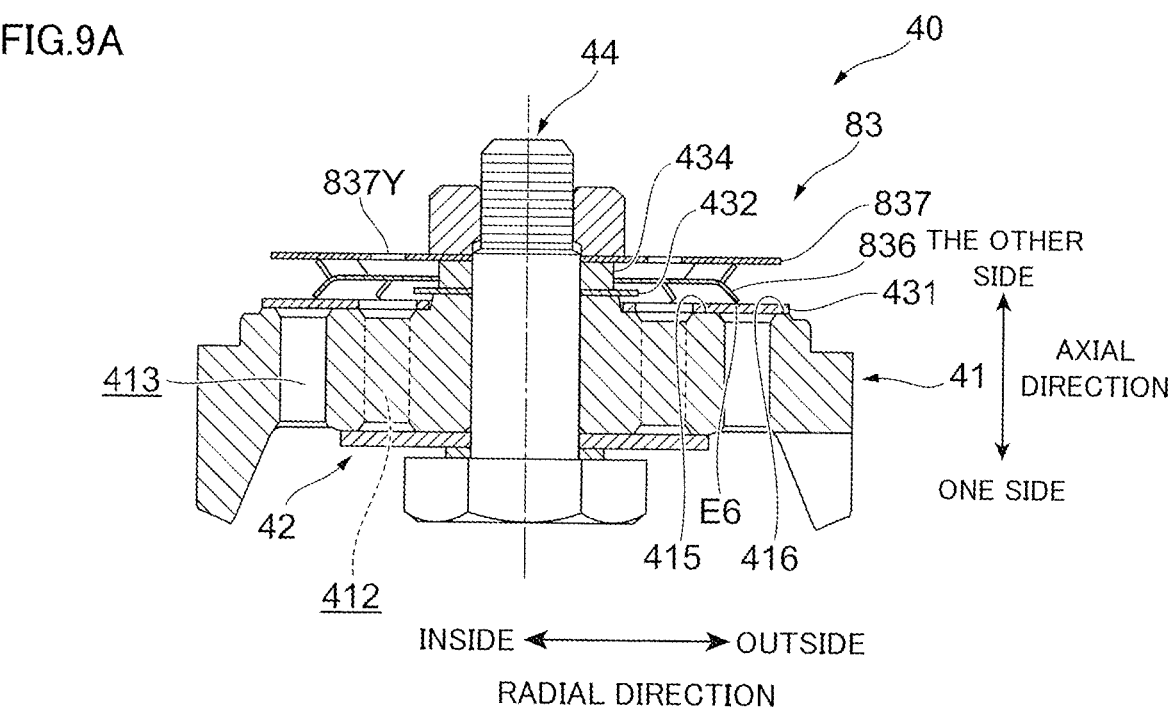
FIGS. 9A and 9B are explanatory diagrams of the hydraulic damper of the fifth embodiment.
Figure 9B:
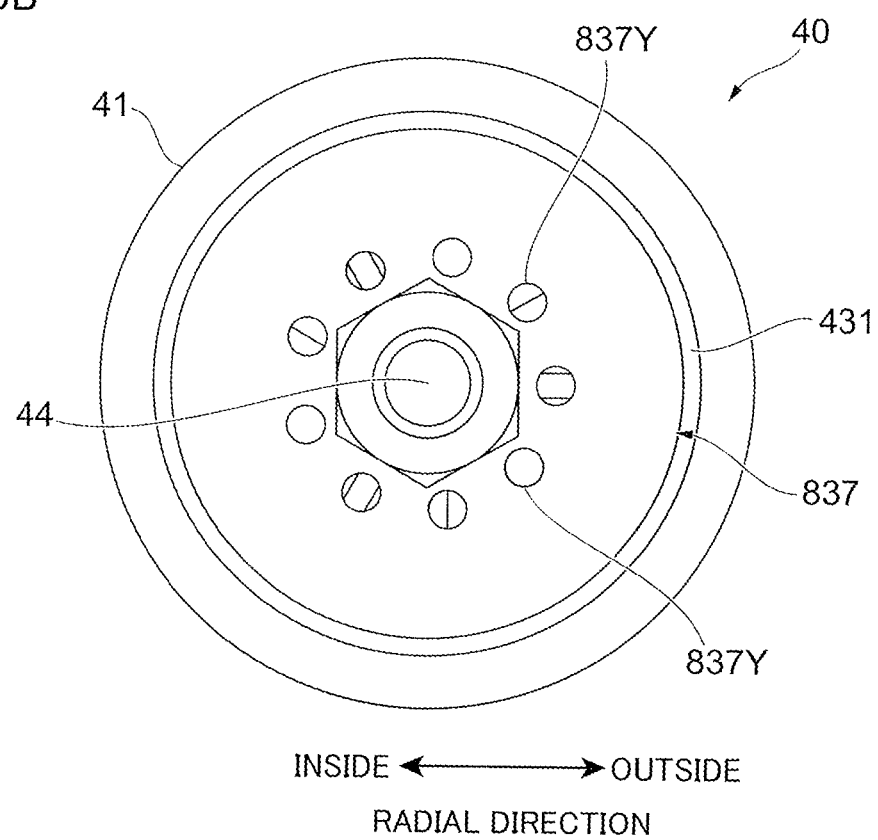

FIGS. 9A and 9B are explanatory diagrams of the hydraulic damper 1 of the fifth embodiment.

In the fifth embodiment, similar components to those in the other embodiments are denoted by the same reference numerals, and detailed explanation thereof will be omitted.

Difference of the hydraulic damper 1 of the fifth embodiment from that of the other embodiments lies in the structure of a check valve unit 83 of the bottom piston unit 40.

As shown in FIG. 9A, the check valve unit 83 of the fifth embodiment includes the check valve 431, the check valve stopper 432, a fifth pressing member 836 at the other side of the check valve stopper 432, a plate spring 837 at the other side of the fifth pressing member 836, and the collar member 434.

The fifth pressing member 836 has the same shape as the pressing member 433 of the first embodiment. Unlike the pressing member 433, however, the fifth pressing member 836 is hardly deformed elastically by movement and deformation of the check valve 431.

Contacting ends E6 of the fifth pressing member 836 of the fifth embodiment contacts the check valve 431 at an area that is outside of the inner round part 415 in the radial direction and inside of the outer round part 416 in the radial direction.

As shown in FIG. 9B, the plate spring 837 is a disk-like metal plate allowing the fixing member 44 to pass therethrough at the inside in the radial direction. The plate spring 837 is held by the fixing member 44 and the collar member 434. The plate spring 837 includes multiple oil ports 837Y.

The plate spring 837 contacts the fifth pressing member 836 at the one side of the plate spring 837. The plate spring 837 presses the check valve 431 against the valve seat 41 through the fifth pressing member 836.

With the above configuration, the bottom piston unit 40 of the fifth embodiment can suppress noise caused by movement of the check valve 431. Durability of the check valve 431 also improves.

SIXTH EMBODIMENT

Figure 10A:
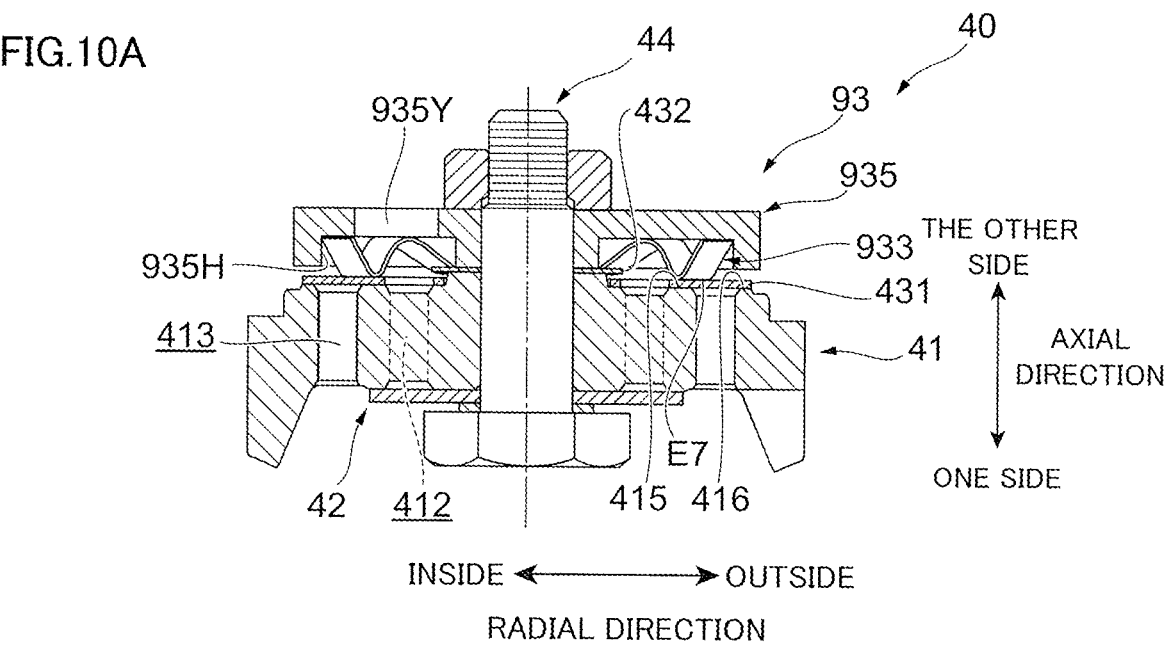
FIGS. 10A to 10C are explanatory diagrams of the hydraulic damper of the sixth embodiment.
Figure 10B:
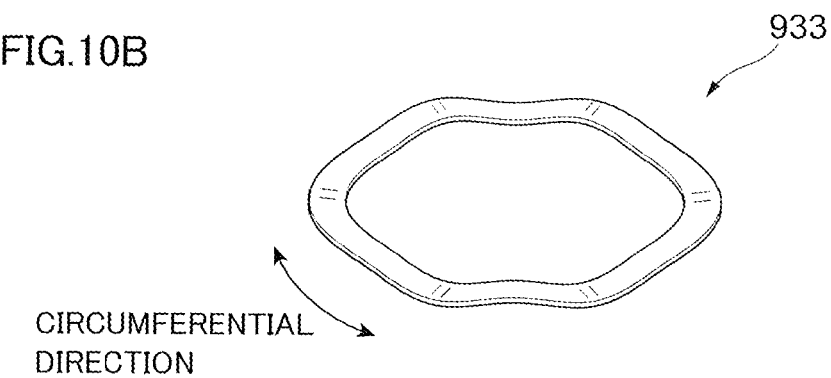
Figure 10C:
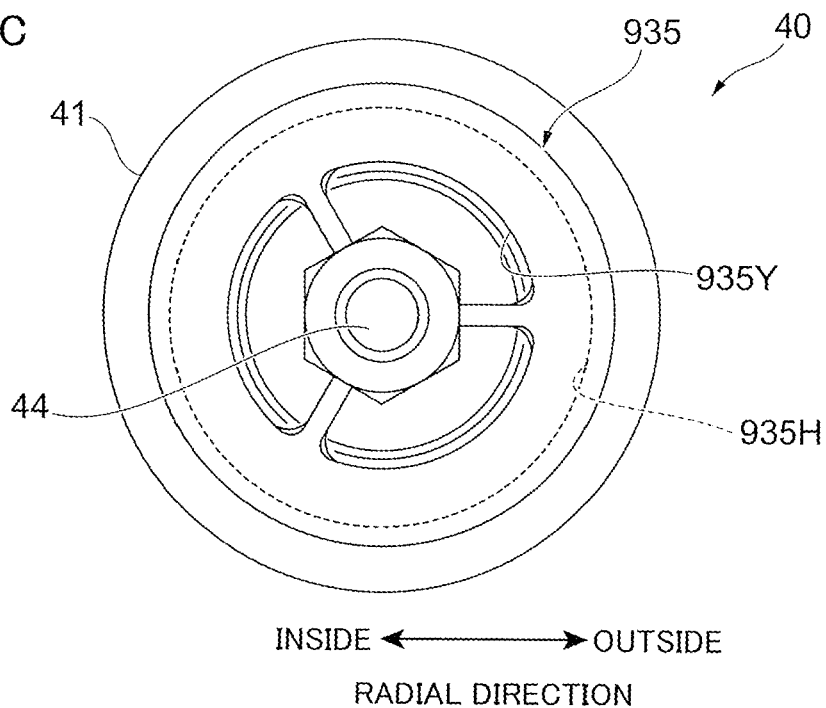

FIGS. 10A to 10C are explanatory diagrams of the hydraulic damper 1 of the sixth embodiment.

In the sixth embodiment, similar components to those in the other embodiments are denoted by the same reference numerals, and detailed explanation thereof will be omitted.

Difference of the hydraulic damper 1 in the sixth embodiment from that in the other embodiments lies in the structure of a check valve unit 93 of the bottom piston unit 40.

As shown in FIG. 10A, the check valve unit 93 of the bottom piston unit 40 of the sixth embodiment includes the check valve 431, the check valve stopper 432, a sixth pressing member 933 at the other side of the check valve stopper 432, and a receiving member 935 (an example of the deformation restricting part) at the other side of the check valve stopper 432.

As shown in FIG. 10B, the sixth pressing member 933 is a wave washer having an annular wave shape. The sixth pressing member 933 is made of metal, such as iron, and has elasticity.

The sixth pressing member 933 contacts the check valve 431 at its contacting ends E7 at the one side, and contacts the receiving member 935 at the other side (see FIG. 10A).

The contacting ends E7 of the sixth pressing member 933 of the sixth embodiment is located in an area that is outside of the inner round part 415 in the radial direction and inside of the outer round part 416 in the radial direction.

As shown in FIG. 10C, the receiving member 935 includes a pressing member accommodation part 935H and oil ports 935Y.

As shown in FIG. 10A, the pressing member accommodation part 935H holds the sixth pressing member 933 so as to radially cover the sixth pressing member 933 from the other side. At the one side, the pressing member accommodation part 935H is spaced from the round plane 41P by a predetermined distance.

The oil ports 935Y are formed on the other side of the receiving member 935 and permit flow of oil through the receiving member 935 in the axial direction.

With the above configuration, the bottom piston unit 40 of the sixth embodiment can suppress noise caused by movement of the check valve 431. Durability of the check valve 431 also improves.

Additionally, in the sixth embodiment, the sixth pressing member 933 is pressed by the receiving member 935 from the other side. This ensures a stable generation of the reaction force of the sixth pressing member 933. Further, the sixth pressing member 933 prevents the check valve 431 from bending more than a certain limit once the bending amount reaches the limit.

Modifications

Figure 11A:
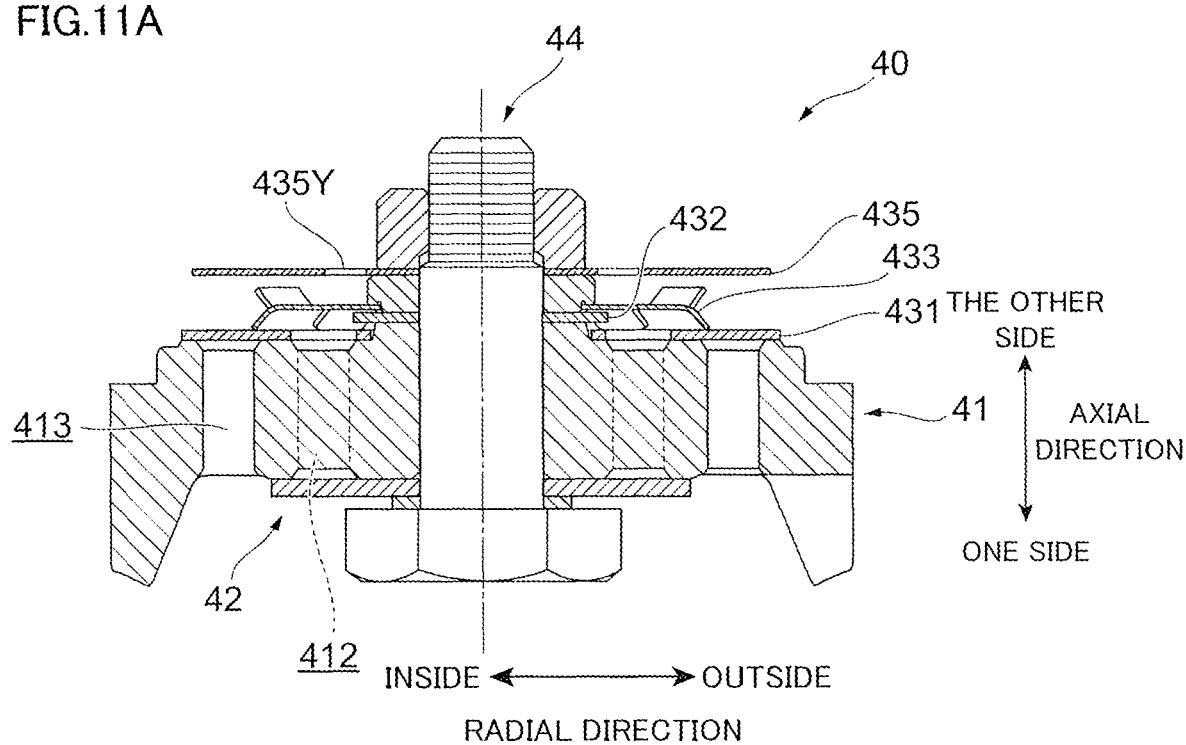
FIGS. 11A and 11B are explanatory diagrams of the bottom piston unit of the first and the second modifications.
Figure 11B:
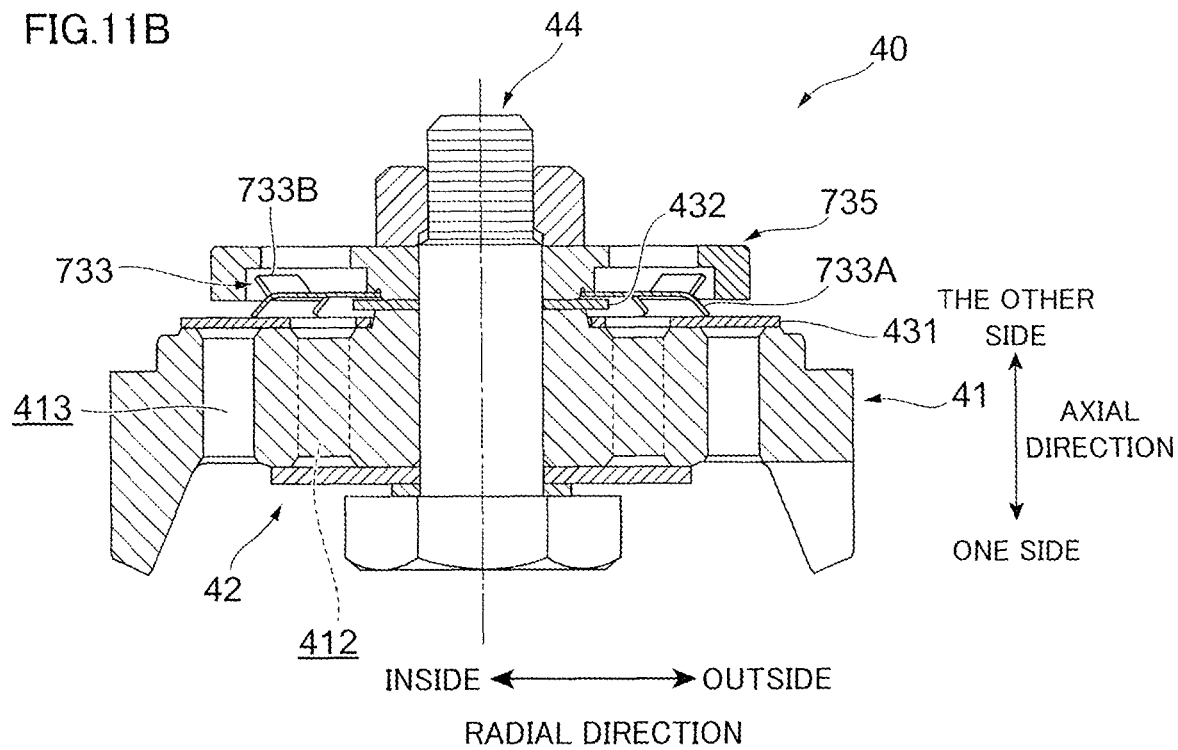

FIGS. 11A and 11B are explanatory diagrams of the bottom piston unit 40 of modifications, where FIG. 11A is an entire view of the bottom piston unit 40 of the first modification, and FIG. 11B is an entire view of the bottom piston unit 40 of the second modification.

Figure 12:
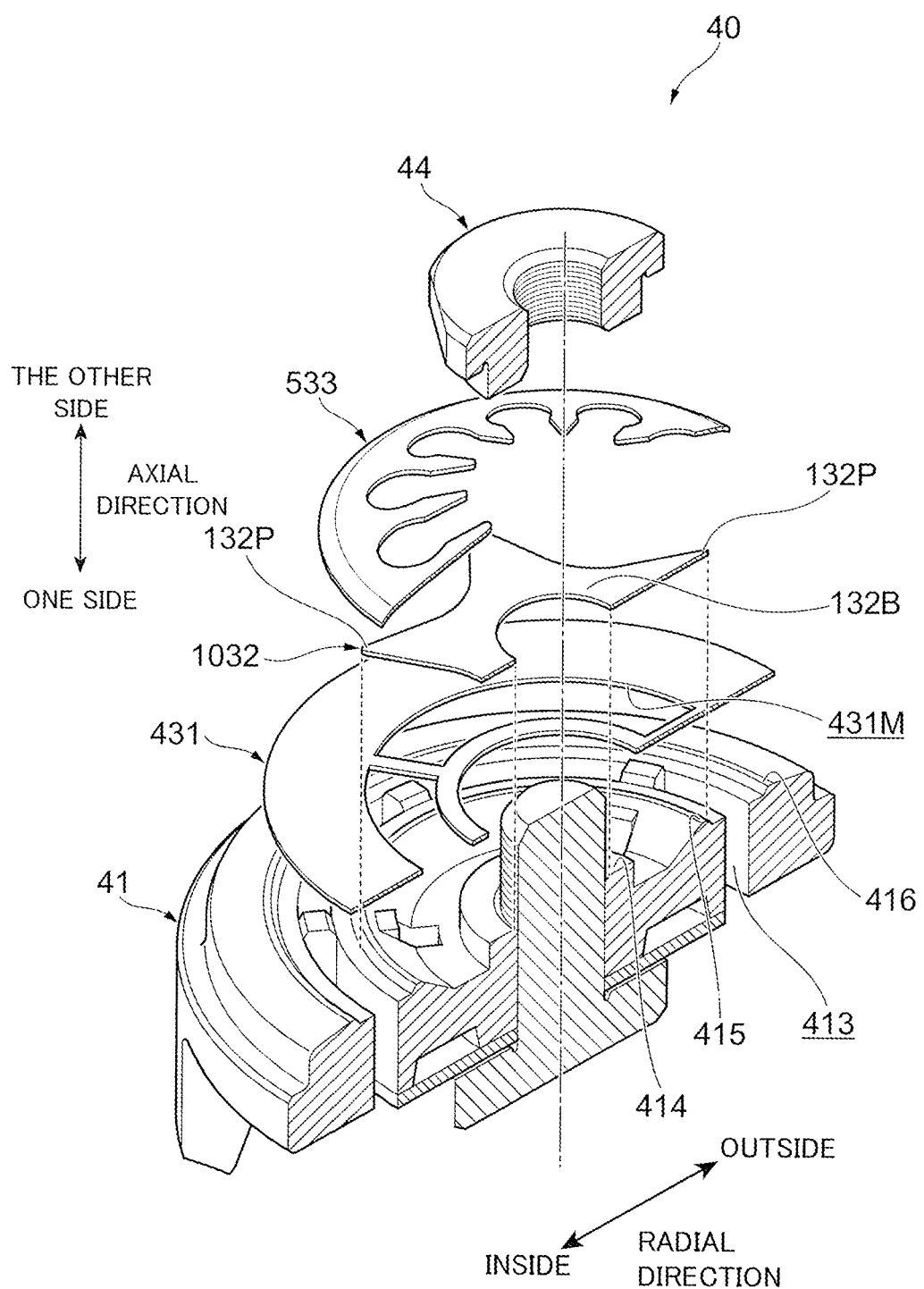
FIG. 12 is an explanatory diagram of the bottom piston unit of the third modification.

FIG. 12 is an explanatory diagram of the bottom piston unit 40 of the third modification.

In the modifications, similar components to those in the above embodiments are denoted by the same reference numerals, and detailed explanation thereof will be omitted.

As shown in FIG. 11A, the bottom piston unit 40 of the first modification has the same basic configuration as the bottom piston unit 40 of the first embodiment, except that the bottom piston unit 40 of the first modification includes a plate member 435 (an example of the contacting member) at the other side of the pressing member 433.

The plate member 435 is a disk-like metal plate allowing the fixing member 44 to pass therethrough at the inside in the radial direction. The plate member 435 includes an oil port 435Y permitting flow of oil.

In the bottom piston unit 40 of the first modification, the plate member 435 contacts the pressing member 433 when bending amount of the check valve 431 reaches a predetermined limit, preventing the check valve 431 from deforming more than the limit.

As shown in FIG. 11B, the bottom piston unit 40 of the second modification has the same basic configuration as the bottom piston unit 40 of the fourth embodiment, except that the bottom piston unit 40 of the second modification is configured such that the second circumferential contacting parts 733B of the fourth pressing member 733 do not contact the receiving member 735 prior to movement and deformation of the check valve 431.

In the bottom piston unit 40 of the second modification, the receiving member 735 contacts the fourth pressing member 733 when bending amount of the check valve 431 reaches a predetermined limit. The receiving member 735 thus prevents the check valve 431 from bending more than the limit.

The bottom piston unit 40 of the third modification has the basically same configuration as the bottom piston unit 40 of the above embodiments, except that the bottom piston unit 40 of the third modification includes a check valve stopper 1032 that is different in shape from the check valve stopper of the above embodiments.

As shown in FIG. 12, the check valve stopper 1032 (an example of the restricting part) includes a main body 132B and protrusions 132P extending from the main body 132B in the radial direction.

The main body 132B has an outer diameter larger than that of the holding structure 414 and smaller than that of the inner round part 415. That is, the main body 132B contacts the check valve 431 at the inside of the check valve oil ports 431M.

Multiple protrusions 132P are arranged at substantially equal intervals in the circumferential direction. The protrusions 132P are larger than the outer diameter of the inner round part 415 of the valve seat 41. That is, the protrusions 132P contact the check valve 431 at the outside of the check valve oil ports 431M.

If the check valve 431 is bent around the check valve oil ports 431M, an increased load is put on the check valve 431 due to stress concentration. In the third modification, however, the protrusions 132P of the check valve stopper 1032 restrict bending of the check valve 431 at the inside of the check valve oil ports 431M.

The shape of the check valve stopper 1032 of the third modification is not limited to that shown in FIG. 12. The check valve stopper 1032 may have any other shape as long as the check valve stopper 1032 permits flow of oil through the check valve oil ports 431M and has a larger diameter than that of the inner round part 415. In the third modification, the outer diameter of the check valve stopper 1032 is smaller than that of the pressing member (e.g., the second pressing member 533).

The thickness of the check valve 431 is preferably small in terms of improving sealing property. However, reducing the thickness of the check valve 431 leads to reduced rigidity. This can be dealt with, for example, by increasing the outer diameter of the check valve stopper 1032 to reduce the bending amount for improved durability, or by modifying the shape of the check valve stopper 1032 to adjust rigidity of the check valve 431, as in the third modification.

The configuration of the bottom piston unit 40 in the first to the sixth embodiments and the first and the second modifications is applicable to the piston unit 30, which partitions the space inside the cylinder 11 into the first oil chamber Y1 and the second oil chamber Y2 and moves along with movement of the rod 20. Specifically, the spring 33 and the piston valve 32 of the piston unit 30 may be replaced with the check valve unit 43 of the bottom piston unit 40.

Although the hydraulic damper 1 of the first to the sixth embodiments has a so-called triple tube structure, the foregoing embodiments are applicable to a so-called double tube structure.

The structure of the bottom piston unit 40 of the first embodiment may be installed in an outside oil storage part provided separately from the cylinder unit 10. In this case, the outside oil storage part may generate damping force against the oil flow that accompanies movement of the rod 20 in the cylinder unit 10.

REFERENCE SIGNS LIST

1 Hydraulic damper
11 Cylinder (an example of the cylinder)
20 Rod (an example of the rod)
40 Bottom piston unit
41 Valve seat (an example of the piston)
431 Check valve (an example of the valve)
432 Check valve stopper (an example of the restricting part)
433 Pressing member (an example of the pressing part)

The invention claimed is:

1. A hydraulic damping device comprising:
a cylinder storing fluid;
a piston configured to form a channel through which the fluid flows along with relative movement of a rod relative to the cylinder in an axial direction;
a valve having elasticity, the valve being configured to open and close the channel in the piston;
a movement permitting part configured to permit the valve to be displaced as a whole between a contact position and a spaced position in the axial direction, the contact position being a position where the valve contacts the piston, the spaced position being a position where the valve is spaced from the piston;
a pressing part having elasticity, the pressing part being configured to press the valve against the piston; and
a restricting part separate from the pressing part and the movement permitting part, the restricting part being configured to annularly contact the valve at a portion thereof radially inside from the channel at the spaced position to thereby restrict the valve from being displaced farther from the spaced position relative to the piston, wherein
the pressing part includes a plurality of protrusions extending radially outward, and
the plurality of protrusions include a first protrusion and a second protrusion, the first protrusion protruding toward the valve, the second protrusion protruding in a direction away from the valve.

2. The hydraulic damping device according to claim 1, further comprising a contacting member located at an opposite side of the pressing part from the valve, the contacting member being configured to contact the second protrusion of the pressing part.

\* \* \* \* \*